Patented Oct. 30, 1923.

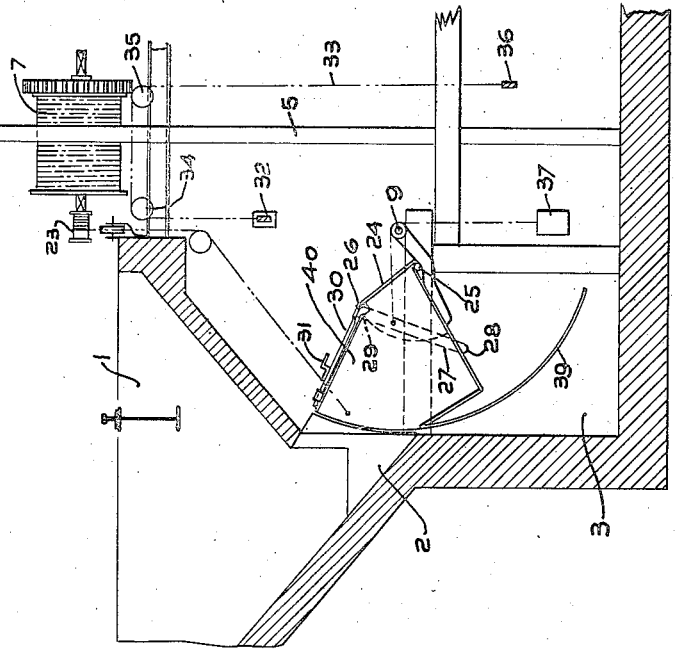
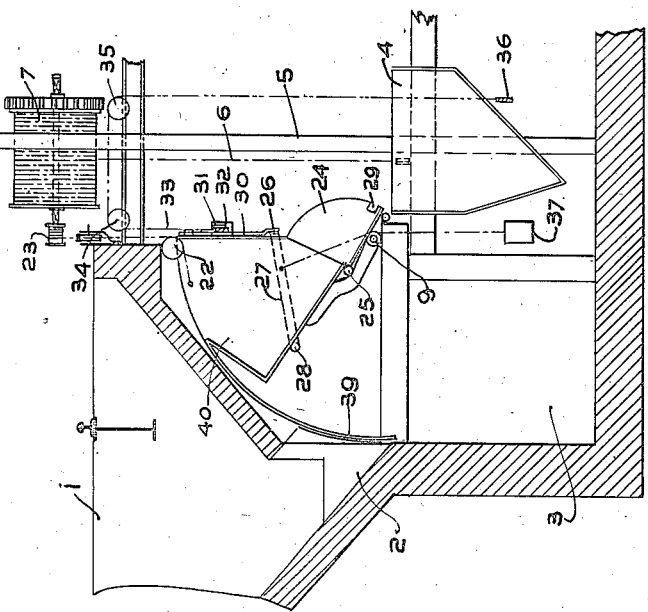

1,472,597

UNITED STATES PATENT OFFICE.

RICHARD S. JACOBSEN, OF CHICAGO, ILLINOIS, ASSIGNOR TO ROBERTS AND SCHAEFER COMPANY, OF CHICAGO, ILLINOIS, A CORPORATION OF ILLINOIS.

SHALLOW-PIT COALING STATION.

Application filed October 19, 1918. Serial No. 258,855.

*To all whom it may concern:*

Be it known that I, RICHARD S. JACOBSEN, a citizen of the United States, and a resident of Chicago, Illinois, have invented a certain new and useful Improvement in Shallow-Pit Coaling Stations, of which the following is a specification.

This invention relates particularly to apparatus for handling coal, and especially to the loading of coal from a bin into a hoisting bucket. In apparatus of this character, the coal is stored in a large bin or hopper, and the hoisting bucket is lowered into a pit to receive a load from the hopper. In a structure of this character it is desirable that the pit be reduced to a minimum depth, as a deep pit is objectionable in various ways.

Generally stated, the object of the invention is to provide a novel and improved apparatus for discharging the coal from the bin or hopper into the bucket, in a satisfactory and effective manner, without the necessity of increasing the depth of the pit, and in a way that makes it possible, in fact, to employ a pit of practically minimum depth.

It is also an object to provide certain details and features of construction and combinations tending to increase the general efficiency and the serviceability of an apparatus of this particular character.

To these and other useful ends the invention consists in matters hereinafter set forth and claimed.

In the accompanying drawings—

Figs. 5 and 6 illustrate a different form of the invention.

Figure 1:
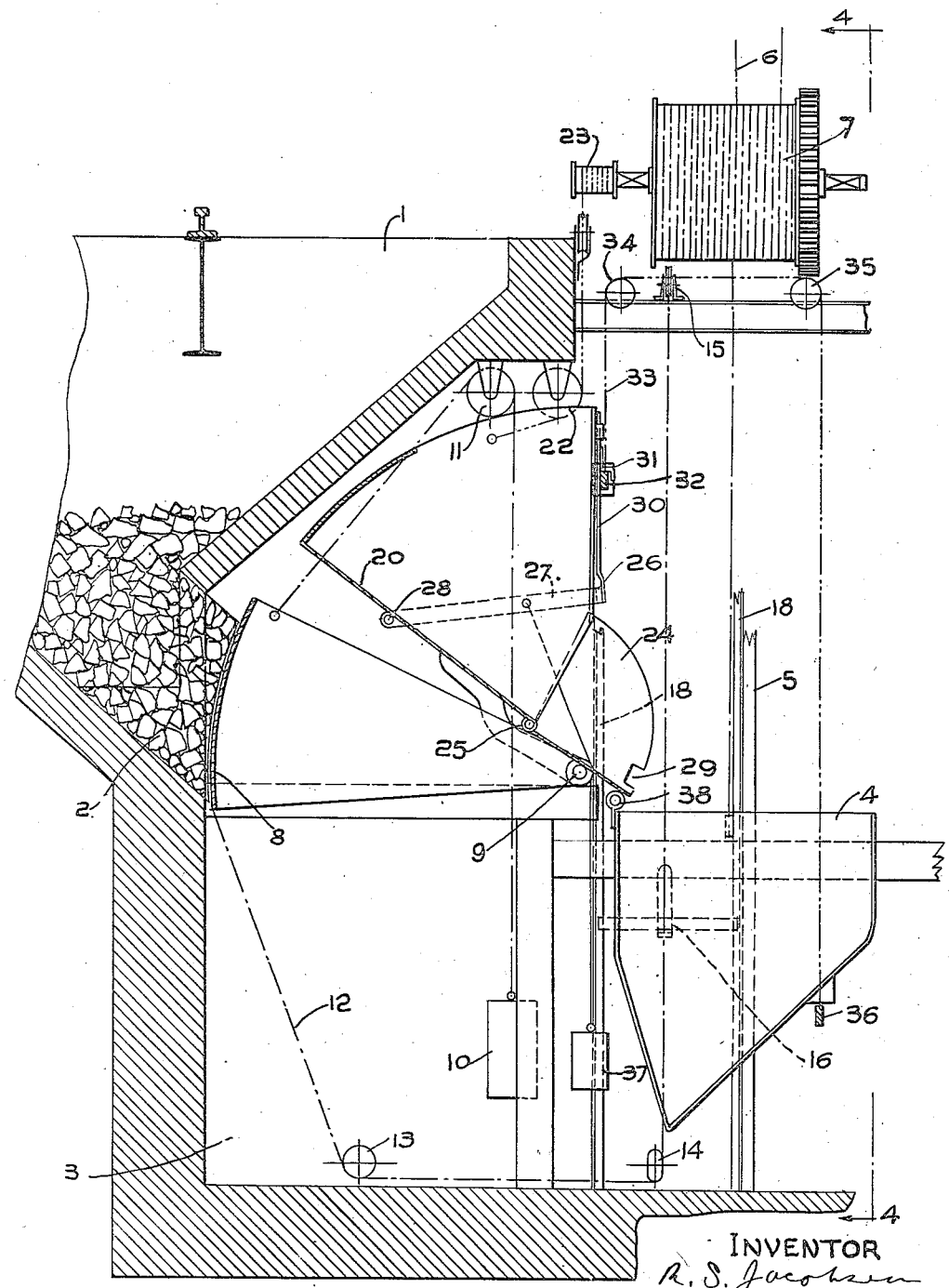
Fig. 1 is a vertical section of a storage bin or hopper and its pit, showing the same equipped with bucket loading apparatus embodying the principles of the invention, the different parts being shown in the positions which they occupy when the bucket is in loading position.

As thus illustrated, and referring to Figs. 1 to 4 inclusive, the invention comprises a bin or hopper 1 having a mouth or discharge opening 2 at the lower end thereof. The pit 3 is arranged below the mouth or discharge opening of the hopper, in the usual manner, and the bucket 4 slides up and down on the guideways 5, being operated by a cable 6 that extends upward from the drum 7 to a sheave (not shown) overhead and then downward to the bucket, so that rotation of said drum serves to raise and lower the bucket. Any suitable arrangement can be employed for dumping the bucket when it reaches the desired point above.

Figure 2:
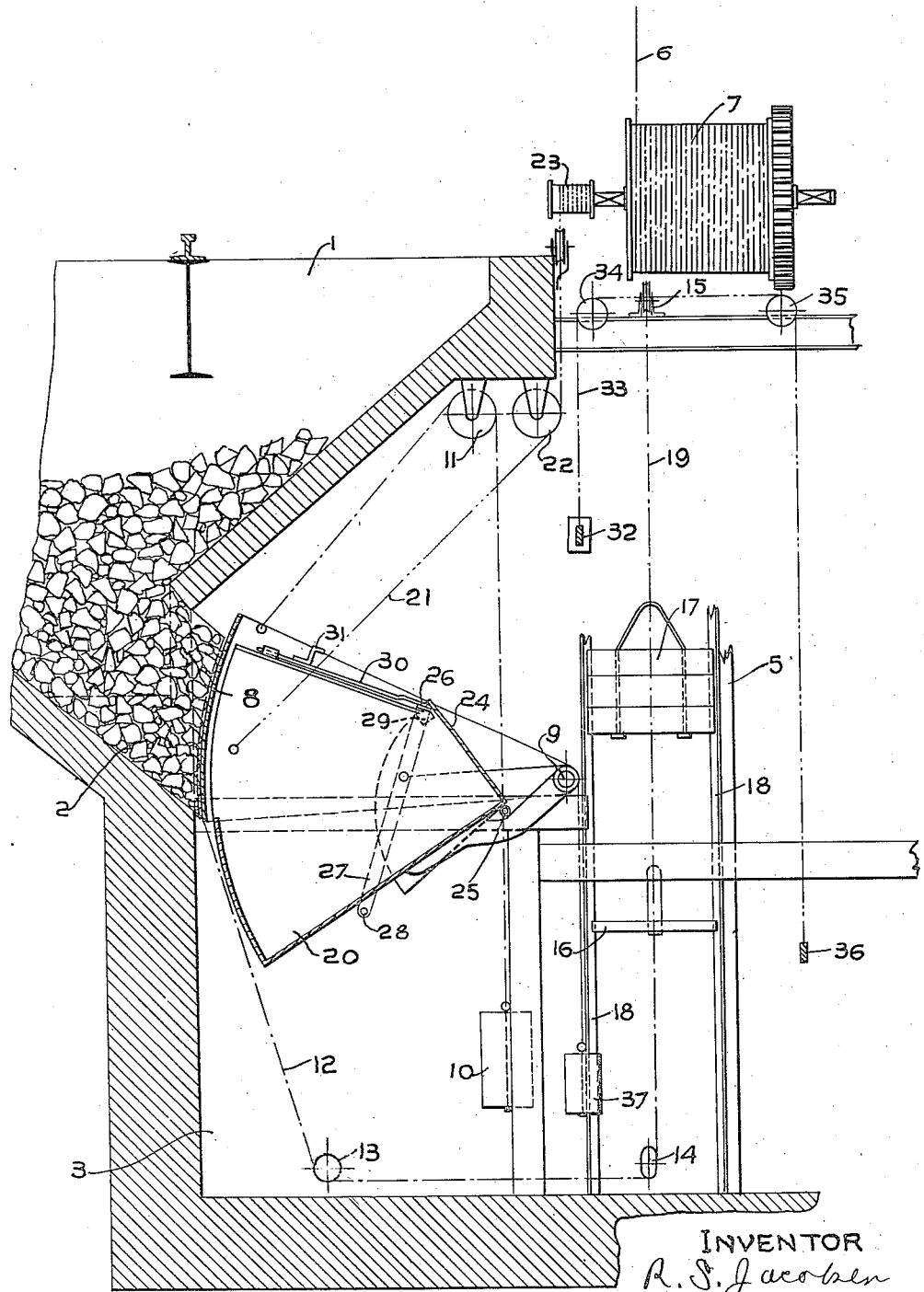
Fig. 2 is a similar view showing certain parts in different positions.
Figure 3:
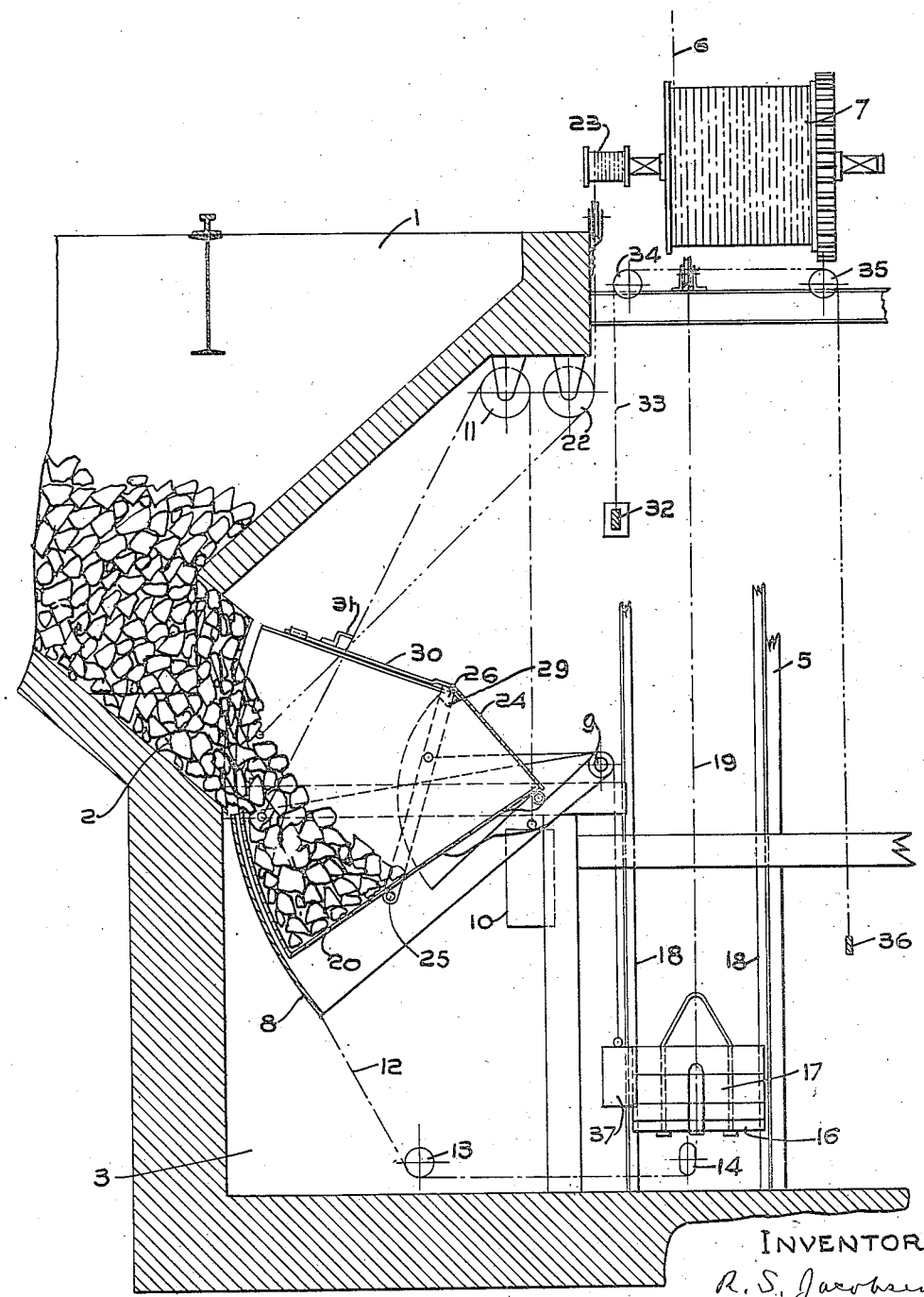
Fig. 3 is a similar view showing a still different condition of the various parts of the apparatus.
Figure 4:
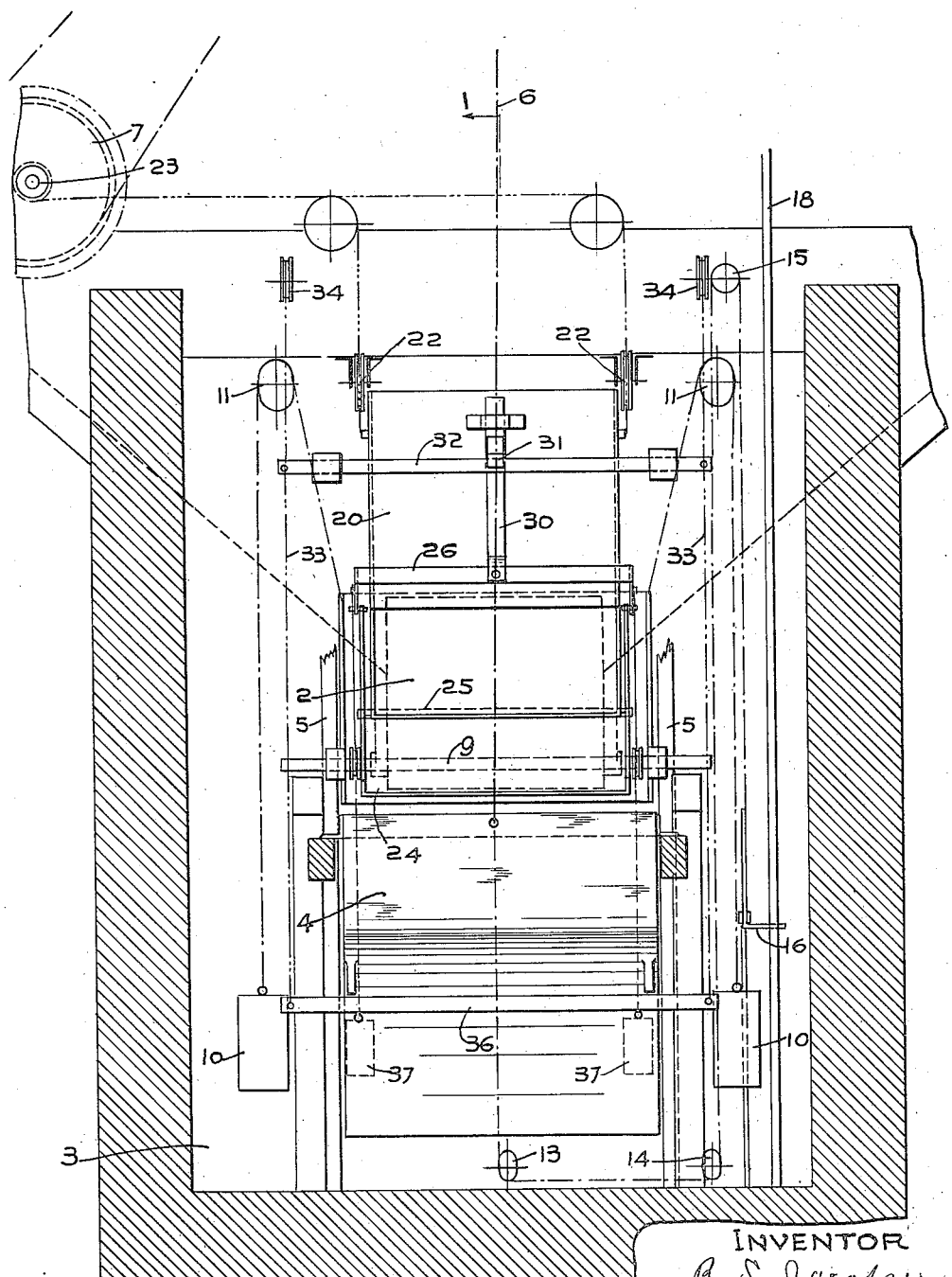
Fig. 4 is a front elevation of said apparatus.

The apparatus for discharging the coal from the bin or hopper into the bucket is as follows: A gate 8 is pivoted at 9 to swing up and down about a horizontal axis, the gate being curved about said axis, and counterweights 10 being suitably connected over sheaves 11 to raise the gate into closed position. The opening of the gate is effected through the medium of a cable 12 which extends downward around the sheaves 13 and 14 and then upward and over the sheave 15 and then downward to the vertically movable cross-head 16 that slides up and down at one side of the bucket. The bucket has a counterweight 17 which slides up and down on guides 18, at one side of the vertical path of travel of the bucket, said counterweight being connected to counterbalance the weight of the bucket in any suitable or desired manner, through the medium of a cable 19 which can be arranged over sheaves in any suitable manner. When the counterweight 17 moves downward and strikes the cross-head 16, the latter then pulls the gate downward, causing the weights 10 to rise a distance. The receptacle 20 is also pivoted at 9 and is of such shape that it is adapted to swing downward into position in front of the gate 8, and somewhat below the mouth of the hopper, as shown in Fig. 2, so that when the gate is pulled downward the coal will be discharged into said receptacle. This receptacle is supported and raised and lowered by a cable 21 which extends around the sheave 22 and then upward and over the small winding drum 23 which is on the shaft of the larger drum 7 previously mentioned. This receptacle 20 has a combined spout and gate 24 pivoted thereon at 25 and held normally closed by a latch bar 26 mounted on arms 27 which are pivoted on the receptacle at 28, said bar being adapted to engage the notches 29 in the outer edges of the spout. The bar 26 is connected by a vertically disposed bar 30 with the hook 31 which extends over a bar 32 when the receptacle is in raised position, this bar 32 being supported by cables 33 arranged over sheaves 34 and 35 and provided at their other ends with a cross bar 36 disposed in the path of the bucket. When the bucket 4 strikes the bar 36 the bar 32 is raised, and this pulls the latch bar 26 upward, thereby releasing the spout 24 and allowing the load in the receptacle to be discharged into the bucket. Counterweights 37 are suitably connected to the arms 27, to pull the bar 26 downward, so that when the spout 24 is pushed upward by the roller 38 on the bucket, the latch bar 26 will again enter the notches 29 to hold the spout in closed position.

It will be understood that the drum 23 is slowly raising the receptacle 20 while the bucket 4 is being lowered, the lowering of the bucket having caused the counterweights 10 to move the gate 8 into closed position. Therefore, by the time the bucket 4 is in lowered position, ready to receive the load, the receptacle 20 is fully raised, and the bucket in striking the bar 36 automatically releases the load from the receptacle 20, so that the load is discharged from the spout 24 into the bucket. Also, while the bucket is moving downward, the weigths 10 are operating to close the gate 8 so that the discharge from the hopper is entirely shut off before the bucket reaches the pit 3 below the hopper.

Thus the coal is discharged downwardly from the hopper, but being too low to enter the bucket, this dischargeed quantity is then raised a distance, by the automatic lifting of the receptacle 20, and is then discharged downwardly again into the bucket. In this way, the advantages of a hopper discharge are retained, but at the same time the depth of the pit 3 is reduced to a minimum, inasmuch as it is not necessary to lower the bucket such a distance as would require a deep pit. Hence the various objections to a deep pit are avoided, but at the same time the coal is automatically discharged from the storage bin or hopper and is then raised by the bucket to the position above where it is to be discharged or delivered, in any suitable known or approved manner. The coal is discharged by gravity from the hopper, and is then hoisted upward by the bucket, but the intermediate step of raising the load after it is discharged into the hopper and before it enters the bucket, in the manner described, obviates the necessity of a direct discharge by gravity from the hopper into the bucket, and the consequent deepening of the pit which would be necessary with such method. This intermediate lifting of the coal a distance between the hopper and the bucket is effected automatically, in the manner described, and insures a quick discharge by gravity of the coal into the bucket as soon as the latter reaches loading position.

In Figs. 5 and 6 the construction is similar to that previously described, except that in this case the curved gate 39 is rigid with the tilting receptacle 40, the latter being like the one previously described. With this construction, the weights 10 shown in Figs. 1, 2, 3, and 4, are not necessary, inasmuch as the raising of the receptacle 40, which latter is like the receptacle 20 shown in the other figures, serves to close the gate 39, so that the mouth to the hopper 1 is closed automatically by the raising of this receptacle. When the receptacle 40 is lowered, the gate 39 moves downward until it opens the mouth of the hopper, as shown in Fig. 6, and a load of coal is discharged into the tilting receptacle. Otherwise the bucket and its operating means and the other elements correspond to those shown in Figs. 1 to 4 inclusive and are operated in the same manner.

While the apparatus shown and described is designed more especially for use in handling coal, it will be understood that it can be used for other purposes, in different ways, without departing from the spirit of the invention.

It will be seen that the coal, when discharged into the tilting receptacle, in effect forms a part of the counterweight for the bucket, so that the operation requires no additional power, the tilting receptacle being slowly raised into discharging position while the bucket is rapidly descending. Thus the weight of the coal in the tilting receptacle is added to the weight of the counterweight itself, and the combined weight is approximately or substantially that which is necessary to properly counterbalance or retard the lowering of the bucket into the pit.

One of the advantages of the construction shown and described, it will be seen, is that the bucket can not come down and receive a load, start upward, and then come back and receive another load on top of the first load. In other words, the bucket after being loaded must be raised and caused to discharge its load before it can travel downward again to receive another load, and should it move downward again after moving upward a short distance, for any reason whatsoever, it will not be able to obtain another load on top of the first load, inasmuch as the counterweight controls the situation in this respect, and must move downward into the pit before another discharge can take place. This prevents spilling of the coal into the pit, which would occur if it were possible for the bucket to receive another discharge on top of the load therein, for the discharging of the coal from the bin is dependent upon the action of the counterweight, and this requires the full raising of the bucket.

It will be seen that the discharge through the opening 2 from the storage bin 1 is at such an angle that the bucket, when in loading position, is much too high to receive the discharge directly from the bin. Should the depth of the pit or space below the bin be increased, so that the top or mouth of the bucket would then be in line with the angular discharge from the bin, the said pit or space would then be too deep, and would be subject to various objections. Therefore, with the construction shown and described, involving the arrangement whereby the bucket when in loading position is above the angular direction of discharge from the bin, the pit or space 3 can be comparatively shallow, and need not be objectionably deep.

What I claim as my invention is:—

1. In apparatus for the purpose set forth, the combination of a hopper having an angular discharge from the bottom thereof, a gate to control the discharge from said hopper, a receptacle to receive the discharge, a hoisting bucket adapted to be lowered to receive a load, means whereby to automatically open said gate, there being space to receive the bucket, and instrumentalities controlled by the operation of the bucket into lowered position to shift said receptacle into position to discharge its load into the lowered bucket, the loading position of the bucket being above the angle of discharge from the hopper, thereby to reduce the depth of said space, and means whereby the load is automatically discharged from said receptacle into the bucket, said receptacle having a discharge mechanism, and means operated by the bucket to control said mechanism and thereby release the load.

2. In apparatus for the purpose set forth, the combination of a hopper having an angular discharge from the bottom thereof, a gate to control the discharge from said hopper, a receptacle to receive the discharge, a hoisting bucket adapted to be lowered to receive a load, means whereby to automatically open said gate, there being space to receive the bucket, instrumentalities controlled by the operation of the bucket into lowered position to shift said receptacle into a position to discharge its load into the lowered bucket, the loading position of the bucket being above the angle of discharge from the hopper, thereby to reduce the depth of said space, means whereby the load is automatically discharged from said receptacle into the bucket, said bucket having a counter-weight, means operated by said counterweight to open said gate, said receptacle having discharge mechanism, means operated by the bucket to control said mechanism and thereby release the load, and means to close the gate, said instrumentalities including a winding drum and cable, and said receptacle being pivoted to tilt upward when the cable is wound upon the drum.

3. In apparatus for the purpose set forth, the combination of a hopper having an angular discharge from the bottom thereof, a gate to control the discharge from said hopper, a receptacle to receive the discharge, a hoisting bucket adapted to be lowered to receive a load, means whereby to automatically open said gate, there being space to receive the bucket, instrumentalities controlled by the operation of the bucket into lowered position to shift said receptacle into position to discharge its load into the lowered bucket, the loading position of the bucket being above the angle of discharge from the hopper, thereby to reduce the depth of said space, means whereby the load is automatically discharged from said receptacle into the bucket, said receptacle being pivoted to tilt upward with its load so that the downward discharge from the hopper is received by said receptacle, then carried upward by the receptacle, and thereafter discharged downwardly into said bucket.

4. In apparatus for the purpose set forth, the combination of a hopper having an angular discharge from the bottom thereof, a gate to control the discharge from said hopper, a receptacle to receive the discharge, a hoisting bucket adapted to be lowered to receive a load, means whereby to automatically open said gate, there being space to receive the bucket, instrumentalities controlled by the operation of the bucket, into lowered position to shift said receptacle into position to discharge its load into the lowered bucket, the loading position of the bucket being above the angle of discharge from the hopper, thereby to reduce the depth of said space, means whereby the load is automatically discharged from said receptacle into the bucket, having guiding means whereby the bucket moves straight up and down in front of said receptacle, and means to provide an axis about which the receptacle tilts in order to discharge its load into the bucket.

5. In apparatus for the purpose set forth, the combination of a hopper having an angular discharge from the bottom thereof, a gate to control the discharge from said hopper, a receptacle to receive the discharge, a hoisting bucket adapted to be lowered to receive a load, means whereby to automatically open said gate, there being space to receive the bucket, instrumentalities controlled by the operation of the bucket into lowered position to shift said receptacle into position to discharge its load into the lowered bucket, the loading position of the bucket being above the angle of discharge from the hopper, thereby to reduce the depth of said space, means whereby the load is automatically discharged from said receptacle into the bucket, in combination with a pit below the mouth of said hopper, means to guide the bucket down into said pit, a counterweight for the bucket, means controlled by the lowering of the counterweight into the pit to open said gate when the bucket is hoisted, means to form an axis for said receptacle, so that the receptacle has an up and down tilting motion, said receptacle having a pivoted discharge spout, and means operated by the lowering of the bucket to release said spout, said spout being movable into closed position by the upward movement of the bucket.

6. In apparatus for the purpose set forth, the combination of a hopper having an angular discharge from the bottom thereof, a gate to control the discharge from said hopper, a receptacle to receive the discharge, a hoisting bucket adapted to be lowered to receive a load, means whereby to automatically open said gate, there being space to receive the bucket, instrumentalities controlled by the operation of the bucket into lowered position to shift said receptacle into position to discharge its load into the lowered bucket, the loading position of the bucket being above the angle of discharge from the hopper, thereby to reduce the depth of said space, means whereby the load is automatically discharged from said receptacle into the bucket, said loader having a pivoted discharge spout, and latch mechanism for said spout, operable by the bucket to release the spout, and means on the bucket to restore the spout to closed position.

7. In apparatus for the purpose set forth, the combination of a hopper to discharge a load downwardly, lifting means to receive and raise the discharged load a distance, and discharge means on said lifting means to discharge the raised load downwardly therefrom and having provisions to retain the raised load in its elevated position until any desired time after the raising thereof.

8. A structure as specified in claim 7, in combination with a bucket to finally receive and hoist the load to a point above, said lifting means having gradual tilting motion while the bucket is being lowered, and means operated by the bucket to release said discharge means.

9. In apparatus for the purpose set forth, the combination of a hopper, a gate to control the discharge from said hopper, a receptacle to receive the discharge, a hoisting bucket, and instrumentalities to shift said receptacle into position to discharge its load into said bucket, said bucket having a counterweight, means operated by said counterweight to open said gate, said receptacle having discharge mechanism, means operated by the bucket to control said mechanism and thereby release the load, and means to close the gate, said instrumentalities including a winding drum and cable, and said receptacle being pivoted to tilt upward when the cable is wound upon the drum.

10. In apparatus for the purpose set forth, the combination of a hopper, a gate to control the discharge from said hopper, a receptacle to receive the discharge, a hoisting bucket, and instrumentalities to shift said receptacle into position to discharge its load into said bucket, in combination with a pit below the mouth of said hopper, means to guide the bucket down into said pit, a counterweight for the bucket, means controlled by the lowering of the counterweight into the pit to open said gate when the bucket is hoisted, means to form an axis for said receptacle, so that the receptacle has an up and down tilting motion, said receptacle having a pivoted discharge spout, and controlling means operated by the lowering of the bucket to release said spout, said spout being movable into closed position by the upward movement of the bucket.

11. In apparatus of the class described, the combination of a hoisting bucket, winding drum mechanism, means on said mechanism for operating said bucket, a storage bin, a tilting loader for receiving the discharge from the bin and delivering the same to the bucket, and means whereby said loader is tilted into discharging position by the operation of said drum mechanism when the bucket is lowered.

12. A structure as specified in claim 11, in combination with mechanism operated automatically by the lowering of the bucket without tilting the latter, to release the contents from said loader, said winding drum mechanism serving to tilt said load gradually while said bucket is being lowered.

13. A structure as specified in claim 11, having space to receive the bucket in position to receive the discharge from said loader, without tilting the bucket, the discharge from said storage bin being at an angle extending below the top of the bucket, so that the bucket in loading position is too high to receive the discharge directly from the storage bin, thereby to reduce the depth of said space.

14. A structure as specified in claim 11, in combination with a gate for controlling the discharge from the storage bin into said loader, a counterweight for said bucket, and means whereby said gate is opened by the final downward movement of said counterweight, together with means for automatically restoring the gate to closed position.

15. In apparatus for the purpose set forth, the combination of a hopper having an angular discharge from the bottom thereof, a gate to control the discharge from said hopper, a receptacle to receive the discharge, a hoisting bucket adapted to be lowered to receive a load, there being space to receive the bucket, and instrumentalities controlled by the bucket to shift said receptacle into position to automatically discharge its load into the lowered bucket, the loading position of the bucket being above the angle of discharge from the hopper, thereby to reduce the depth of said space, said receptacle having a discharge mechanism, and means operated by the bucket to control said mechanism and thereby release the load.

16. In apparatus for the purpose set forth, the combination of a hopper having an angular discharge from the bottom thereof, a gate to control the discharge from said hopper, a receptacle to receive the discharge, a hoisting bucket adapted to be lowered to receive a load, there being space to receive the bucket, and instrumentalities controlled by the bucket to shift said receptacle into position to automatically discharge its load into the lowered bucket, the loading position of the bucket being above the angle of discharge from the hopper, thereby to reduce the depth of said space, said loader having a pivoted discharge spout, and latch mechanism for said spout, operable by the bucket to release the spout, and means on the bucket to restore the spout to closed position.

RICHARD S. JACOBSEN.